United States Patent
Nolan et al.

(10) Patent No.: US 11,632,352 B2
(45) Date of Patent: Apr. 18, 2023

(54) FULFILLMENT OF REQUESTS STORED ON A MESSAGE QUEUE

(71) Applicant: Microsoft Technology Licensing, LLC, Redmond, WA (US)

(72) Inventors: James Richard Nolan, Bothell, WA (US); Naveed Alam, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 421 days.

(21) Appl. No.: 16/776,141

(22) Filed: Jan. 29, 2020

(65) Prior Publication Data
US 2021/0234855 A1    Jul. 29, 2021

(51) Int. Cl.
*H04L 29/12* (2006.01)
*H04L 61/00* (2022.01)
*G06F 9/54* (2006.01)
*H04L 9/40* (2022.01)

(52) U.S. Cl.
CPC .............. *H04L 61/00* (2013.01); *G06F 9/546* (2013.01); *G06F 2209/548* (2013.01); *H04L 63/0823* (2013.01); *H04L 63/166* (2013.01)

(58) Field of Classification Search
CPC ..... H04L 29/12; G06F 9/546; G06F 2209/548
USPC .......................................................... 709/217
See application file for complete search history.

(56) References Cited

U.S. PATENT DOCUMENTS

| | | | |
|---|---|---|---|
| 10,439,825 B1 | 10/2019 | Meyer et al. | |
| 2013/0013924 A1* | 1/2013 | Dixon | H04L 63/101 |
| | | | 713/168 |
| 2015/0254439 A1 | 9/2015 | Ao et al. | |
| 2017/0142129 A1* | 5/2017 | Peng | H04L 63/061 |
| 2017/0180269 A1* | 6/2017 | Payne | H04L 47/00 |

OTHER PUBLICATIONS

"International Search Report and Written Opinion Issued in PCT Application No. PCT/US21/014050", dated Apr. 9, 2021, 12 Pages.

* cited by examiner

*Primary Examiner* — Sibte H Bukhari
(74) *Attorney, Agent, or Firm* — Mannava & Kang, P.C.

(57) ABSTRACT

According to examples, an apparatus may include a processor and a memory on which is stored machine readable instructions that may cause the processor to determine whether a request is stored in a message queue, in which the apparatus may be inside of a domain and the message queue may be outside of the domain. Based on a determination that a request is stored in the message queue, the processor may pull the request from the message queue through a domain boundary, fulfill the request to cause a response to the request to be generated, and forward the response to the message queue through the domain boundary.

18 Claims, 5 Drawing Sheets

FULFILLMENT OF REQUESTS STORED ON A MESSAGE QUEUE

BACKGROUND

Client devices may often communicate with servers over a network to access services provided by the servers. Prior to communicating with the client devices, the servers may authenticate the client devices to, for instance, prevent an unauthenticated client device from accessing services provided by the servers. For instance, the servers may implement an authentication scheme in which the client devices provide signed digital certificates to the servers to prove that the client devices are authentic. The client devices may obtain the signed digital certificates from certificate authorities that the servers trust and the certificate authorities may only provide the signed digital certificates to the client devices if the client devices are authentic. As a result, the servers may accept the signed digital certificates as proof of authenticity of the client devices. A certificate authority may create a signed digital certificate by digitally signing, with its own private key, identifying information submitted to the certificate authority along with the public key of the client device seeking the certificate.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, apparatuses, methods, and computer-readable media in which a processor may securely fulfill a request for a requester that is remote from the processor. Particularly, the requester may submit a request, for instance, for issuance of a signed digital certificate for the requester that the requester may use to access a secure service provided by a website. As discussed herein, the requester may submit the request to a message queue in which the message queue may be outside of a domain in which the processor may be operating. The processor may initiate a connection with the message queue through a domain boundary and may determine whether the request is stored on the message queue. The processor may also pull the request from the message queue. As such, for instance, the message queue may not initiate a connection with the processor.

The processor may also fulfill the request by, for instance, forwarding the request to a server, e.g., a certificate authority, which may determine whether the request is to be granted. Based on a determination that the request is to be granted, the server may generate a response, e.g., a signed digital certificate, and may forward the response to the processor. The processor may forward the response to the message queue through the connection or may initiate another connection through the domain boundary through which the processor may forward the response.

According to examples, the systems disclosed herein may include multiple message queues, multiple apparatuses, and/or multiple servers that may fulfill requests. Each of the multiple message queues may operate similarly to each other concurrently or as redundant message queues with respect to each other. Likewise, the multiple apparatuses may operate similarly to each other concurrently or as redundant apparatuses with respect to each other. The multiple apparatuses may also operate concurrently or as redundant servers with respect to each other.

Through implementation of various features of the present disclosure, a processor may securely access requests, for instance, for signed digital certificates, from a message queue. That is, by initiating communications to the message queue from within the domain boundary, an attack vector to hijack an incoming connection to the devices within the domain may be prevented. In addition, through implementation of the multiple message queues, multiple apparatuses, and/or multiple servers, the system disclosed herein may scale seamlessly as the number of requests to be fulfilled increase. Moreover, the use of redundant message queues, apparatuses, and/or servers as disclosed herein may increase reliability as well as tolerance to failures in any of those components. Thus, for instance, the features of the present disclosure include technical improvements directed to securely communicating and fulfilling requests as well as improved scalability and fault tolerance.

Figure 1:
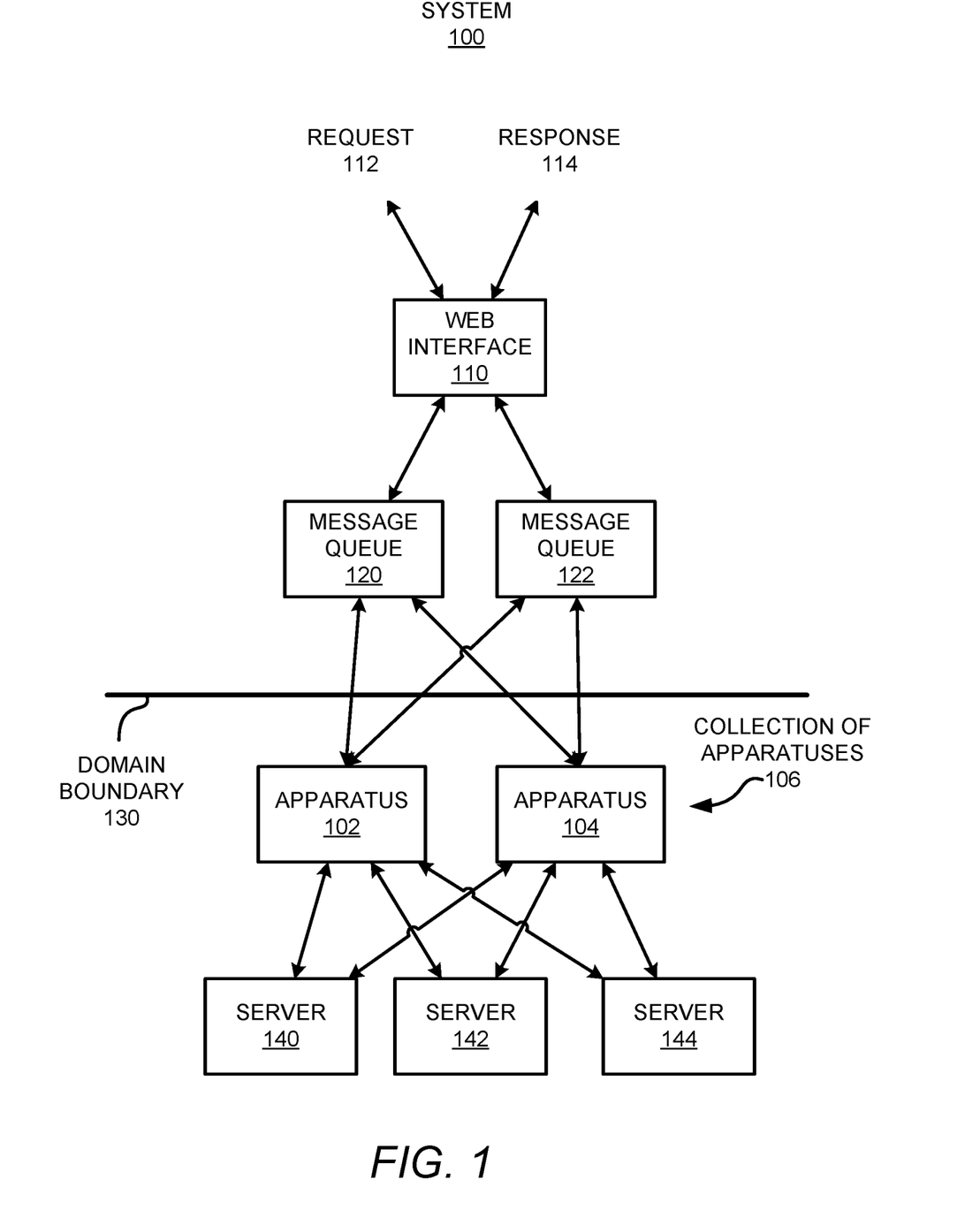
FIG. 1 shows a block diagram of a system that may include an apparatus, in which the apparatus may securely fulfill a request for a response, in which the request is submitted outside of a domain and the request is fulfilled within the domain, in accordance with an embodiment of the present disclosure.
Figure 2:
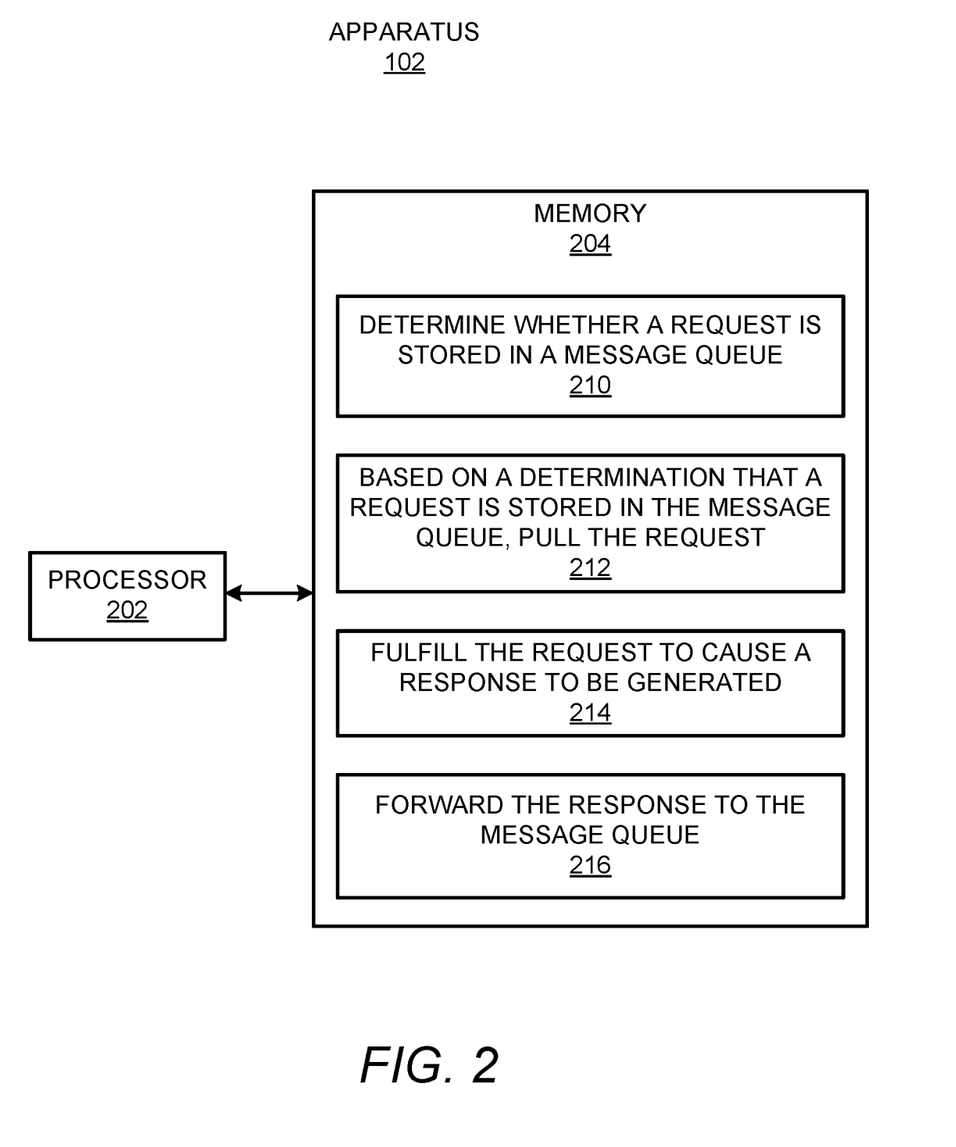
FIG. 2 shows a block diagram of the apparatus depicted in FIG. 1, in accordance with an embodiment of the present disclosure.

Reference is first made to FIGS. 1 and 2. FIG. 1 shows a block diagram of a system 100 that may include an apparatus 102, in which the apparatus 102 may securely fulfill a request for a response, in which the request is submitted outside of a domain and the request is fulfilled within the domain, in accordance with an embodiment of the present disclosure. FIG. 2 shows a block diagram of the apparatus 102 depicted in FIG. 1, in accordance with an embodiment of the present disclosure. It should be understood that the system 100 and the apparatus 102 may include additional features and that some of the features described herein may be removed and/or modified without departing from the scopes of the system 100 and/or the apparatus 102.

As shown in FIG. 1, the system 100 may include a web interface 110 through which a requester (not shown) may submit a request 112 and may receive a response 114 to the request 112. According to examples, the web interface 110 may include an application, a website, or the like, that a requester, e.g., a client, a customer, a user, a client device, or the like, may access via a network, such as the Internet. For instance, the requester may submit a request 112 for an authorization to access services provided by a particular website. In some examples, the request 112 may be a request for a signed digital certificate (also recited as a signed certificate herein) that the requester may use to login into a particular website, such as, for instance, a banking website, a medical website, an investment services provider website, and/or the like. In these examples, the response 114 may be or may be a message that includes a signed certificate that the requester may use to access the services provided by the particular website. In other examples, the request 112 may be for various other purposes and the response 114 may correspondingly be for those various other purposes. By way of example, the request 114 may be a request to revoke a certificate in which a selected certificate may be added to a Certificate Revocation List (CRL) and published according to Certificate Authority (CA) rules. As other examples, the request 114 may include a statistical and/or management request, e.g., a request to update the processor, change the list of available CAs, accepting different types of certificates, and/or the like.

As also shown in FIG. 1, the system 100 may include a message queue 120 to which the web interface 110 may forward the request 112. The web interface 110 may forward the request 112 to the message queue 120 in any suitable manner such as, for instance, via a network such as the Internet, a cellular network, and/or the like. In any regard, the message queue 120 may include a data storage device on which the request 112 may be stored. In some examples, the message queue 120 may track the order in which the request 112 and other requests are received and stored such that, for instance, when the message queue 120 stores multiple requests, the requests may be accessed in the order in which they were received, e.g., in a first in first out manner. In other examples, the requests stored in the message queue 120 may be outputted in any of other suitable manners. In any regard, the requests stored in the message queue 120 may be pulled from the message queue 120 such that the requests may be fulfilled as discussed in detail herein.

In some examples, and as shown in FIG. 1, the system 100 may include a second message queue 122 that may function similarly to the message queue 120. In these examples, the web interface 110 may communicate requests 112 that the web interface 110 receives to either or both of the message queues 120, 122. In addition, the requests 112 stored in the message queues 120, 122 may be pulled from the message queues 120, 122 for fulfillment of the requests as discussed herein. In one regard, the inclusion of multiple message queues 120, 122 in the system 100 may enable scalability in the number of requests 112 that the system 100 may collect and fulfill. The multiple message queues 120, 122 may also increase reliability of the system 100 as one of the message queues 120, 122 may function redundantly, e.g., as a backup, of the other message queue in some examples.

As further shown in FIG. 1, the apparatus 102 may communicate with the message queues 120, 122 through or across a domain boundary 130. That is, the apparatus 102 may operate within the domain boundary 130 and the message queues 120, 122 and the web interface 110 may operate outside of the domain boundary 130. Thus, for instance, the apparatus 102 may be part of a domain in which apparatuses and other devices within the domain may be accessed and administered with a common set of rules and procedures while the message queues 120, 122 and the web interface 110 are outside of that domain. As such, for instance, the message queues 120, 122 may not have authorization to access the devices in which the apparatus 102 is included. In other words, the message queues 120, 122 may not be authorized to establish connections with the apparatus 102 through the domain boundary 130.

According to examples, the message queues 120, 122 may not initiate connections to the apparatus 102 such that, for instance, the connections between the apparatus 102 and the message queues 120, 122 may not be initiated outside of the domain to inside of the domain. As a result, access to the apparatus 102 as well as to other devices within the domain may be protected from attack as there may not be an attack vector to hijack an incoming connection to the devices within the domain. Instead, the apparatus 102 may initiate connections to the message queues 120, 122 such that, for instance, an outbound connection through the domain boundary 130 may only be initiated between the apparatus 102 and the message queues 120, 122. Because there is no inbound connection to hijack, any attacks would have to not only imitate the message queues, but also be limited in scope to operations that message queue 120 is authorized to perform. Thus, security may be increased both by making the system 100 significantly more difficult to access and by further limiting the actions that may be taken even if the connection through the domain boundary 130 is compromised.

As shown in FIG. 1, the system 100 may include a second apparatus 104 that may function similarly to the apparatus 102. In these examples, the apparatuses 102, 104 may form a collection of apparatuses 106 that may function together to fulfill requests 112 and to communicate responses 114 to the requests 112 to the message queues 120, 122. That is, for instance, each of the apparatuses 102, 104 may pull the requests 112 stored in the message queues 120, 122 and may cause the requests 112 to be fulfilled. In some examples, each of the apparatuses 102, 104 may determine whether the apparatus 102, 104 is to pull a request 112 from a message queue 120 and may pull the request 112 based on a determination that the apparatus 102, 104 is to pull the request 112. The apparatuses 102, 104 may determine whether the apparatus 102, 104 is to pull the request 112 based on whether a configurable scheduling scheme indicates that the apparatus 102, 104 is to pull the request 112.

The configurable scheduling scheme may be a scheme that a user may configure to cause one of the apparatuses 102, 104 to pull a request 112 stored in the message queue 120. For instance, the configurable scheduling scheme may be a round-robin scheme in which the apparatuses 102, 104 take turns pulling requests 112 from the message queue 120. As another example, the configurable scheduling scheme may be a random scheme in which, for instance, the first apparatus 102, 104 to determine that a request 112 is stored in the message queue 120 pulls the request from the message queue 120. In other words, the apparatus 102 that is able to take on a new request may access the message queue 120 first and may pull the request 112. In any regard, each of the apparatuses 102, 104 may be part of a collection of apparatuses 106 and may take turns with each other in pulling the requests 112 stored in the message queue 120, 122.

In one regard, the inclusion of multiple apparatuses 102, 104 in the system 100 may enable scalability in the number of requests 112 that the system 100 may collect and fulfill. The multiple apparatuses 102, 104 may also increase reliability of the system 100 as one of the apparatuses 102, 104 in the collection of apparatuses 106 may function redundantly, e.g., as a backup, of another apparatus in some examples.

Although referenced herein as separate apparatuses 102, 104, it should be understood that the apparatuses 102, 104 may instead be processes, e.g., applications, virtual machines, microservices, and/or the like, that may perform the functions described in the present disclosure. Thus, for instance, the apparatus 102 may have executing thereon multiple processes that may pull requests 112 from the message queue 120. In other examples, the multiple processes may execute on multiple apparatuses 102, 104. In any regard, the processes may pull the requests 112 according to a configurable scheduling scheme as discussed herein with respect to the apparatuses 102, 104.

As further shown in FIG. 1, the system 100 may include a server 140 that may process the requests 112. The server 140 may be within the domain of the apparatuses 102, 104, and thus, for instance, the server 140 may be accessed and administered with a set of rules and procedures that may be common to the set of rules and procedures that may be used to access and administer the apparatuses 102, 104. In any regard, the apparatus 102 may communicate a request 112 to the server 140 for the server 140 to process the request 112 and generate a response to the request 112. By way of particular example in which the request 112 is for a signed certificate, the server 140 may be a certificate authority and may process the request 112 to determine whether to issue the signed certificate for a request of the request 112. For instance, the server 140 may determine whether the requester is authorized to receive the signed certificate to access a particular service provided by a website, e.g., has the proper credentials to access the services provided by the particular website. Based on a determination that the requester is authorized to receive the signed certificate, the server 140 may generate the signed certificate and may communicate the signed certificate to the apparatus 102.

However, based on a determination that the requester is not authorized to receive the signed certificate, the server 140 may send a message to the apparatus 102 that an error occurred and that the signed certificate has not been generated. In any event, the apparatus 102 may communicate a response 114 containing the signed certificate or the error message to the message queue 120 through the domain boundary 130. In some examples, the message queue 120 may store the response 114 containing the signed certificate or the error message. In these examples, the web interface 110 may listen to the message queue 120 to determine whether the response 114 containing the signed certificate or the error message has been stored in the message queue 120. Based on a determination that the response 114 containing the signed certificate or the error message is available on the message queue 120, the web interface 110 may pull the response 114 from the message queue 120 and make the response 114 available for the requester. The web interface 110 may also forward the response 114 to the requester.

As shown in FIG. 1, the system 100 may include other servers 142-144 that may function similarly to the server 140. That is, the other servers 142-144 may be within the domain of the apparatuses 102, 104 as well as the server 140. In some examples, the servers 140-144 may process similar types of requests 112 and may generate similar types of responses 114. Thus, for instance, the servers 140-144 may each determine whether a requester is authorized to receive a signed certificate to access a particular website. In these examples, the apparatuses 102, 104 may selectively communicate requests to the servers 140-144 according to a configurable scheduling scheme. For instance, the apparatuses 102, 104 may communicate requests according to a round robin scheme, according to the bandwidth availabilities of the servers 140-144, and/or the like.

In other examples, the servers 140-144 may process different types of requests with respect to each other. For instance, one of the servers 140 may process requests for signed certificates for a first service and another one of the servers 142 may process requests for signed certificates for a second service. As another example, the servers 140-144 may process other types of different requests. In any of these examples, the apparatuses 102, 104 may communicate the request to the appropriate server 140-144 based on the type of the request.

Turning now to FIG. 2, the apparatus 102 depicted in FIG. 1 is shown in greater detail. The apparatus 102 may be a computing device such as a server computer, a laptop computer, a tablet computer, or the like. In addition, the apparatus 102 may include a processor 202 that may control operations of the apparatus 102 and a memory 204 on which data that the processor 202 may access and/or may execute may be stored.

The processor 202 may be a semiconductor-based microprocessor, a central processing unit (CPU), an application specific integrated circuit (ASIC), a field-programmable gate array (FPGA), and/or other hardware device. The memory 204, which may also be termed a computer readable medium, may be, for example, a Random Access memory (RAM), an Electrically Erasable Programmable Read-Only Memory (EEPROM), a storage device, or the like. The memory 204 may be a non-transitory computer readable storage medium, where the term "non-transitory" does not encompass transitory propagating signals. In any regard, the memory 204 may have stored thereon machine readable instructions that the processor 202 may execute.

Although the apparatus 102 is depicted as having a single processor 202, it should be understood that the apparatus 102 may include additional processors and/or cores without departing from a scope of the apparatus 102. In this regard, references to a single processor 202 as well as to a single memory 204 may be understood to additionally or alternatively pertain to multiple processors 202 and multiple memories 204. In addition, or alternatively, the processor 202 and the memory 204 may be integrated into a single component, e.g., an integrated circuit on which both the processor 202 and the memory 204 may be provided.

As shown in FIG. 2, the memory 204 may have stored thereon machine-readable instructions 210-216 that the processor 202 may execute. Although the instructions 210-216 are described herein as being stored on the memory 204 and may thus include a set of machine readable instructions, the apparatus 102 may include hardware logic blocks that may perform functions similar to the instructions 210-216. For instance, the processor 202 may include hardware components that may execute the instructions 210-216. In other examples, the apparatus 102 may include a combination of instructions and hardware logic blocks to implement or execute functions corresponding to the instructions 210-216. In any of these examples, the processor 202 may implement the hardware logic blocks and/or execute the instructions 210-216. As discussed herein, the apparatus 102 may also include additional instructions and/or hardware logic blocks such that the processor 202 may execute operations in addition to or in place of those discussed above with respect to FIG. 2.

The processor 202 may execute the instructions 210 to determine whether a request 112 is stored in a message queue 120. The request 112 may be an unfilled request 112, a pending request 112, a message including the request 112, and/or the like. That is, a web interface 110 may have received the request 112 from a requester (not shown) and the web interface 110 may have communicated the request 112 to the message queue 120. The message queue 120 may store the request 112 until the processor 202 pulls the request 112 from the message queue 120. That is, for instance, the message queue 120 may not initiate a communication with the processor 202 responsive to receipt and storage of the request 112. Instead, the processor 202 may listen for storage of requests 112 in the message queue 120 (e.g., may employ a message listener to check for requests in the message queue 120). Thus, for instance, the processor 202 may check for requests stored in the message queue 120 at various times, continuously, etc.

As shown in FIG. 1, the apparatus 102 may be inside of a domain (e.g., within a domain boundary 130) and the message queue 120 may be outside of the domain (e.g., outside of the domain boundary 130). As the processor 202 may initiate communication with the message queue 120 such that the communication may be initiated from within the domain boundary 130, the devices within the domain may be protected from attack as discussed herein.

The processor 202 may execute the instructions 212 to, based on a determination that a request 112 is stored in the message queue 120, pull the request 112 from the message queue 120 through the domain boundary 130. In addition, the processor 202 may execute the instructions 214 to fulfill the request 112 to cause a response 114 to the request 112 to be generated. In some examples, the processor 202 may open a secure socket connection using, for instance, Transport Layer Security and may communicate with the message queue 120 via the Active Message Queue Protocol through the domain boundary 130 and may pull the request 112 from the message queue 120 through the established connection.

The processor 202 may determine how the request 112 is to be fulfilled. For instance, the processor 202 may determine whether the request 112 is to be forwarded to a server 140, which server 140-144 is to receive the request 112, and/or the like. In addition, the processor 202 may forward the request 112 to the server 140-144, which may process the request 112 and generate a response 114 as discussed herein. The server 140-144 may also send the response 114 to the processor 202.

The processor 202 may execute the instructions 216 to forward the response 114 to the message queue 120 through the domain boundary 130. For instance, the processor 202 may establish a connection to the message queue 120 through the domain boundary 130. The processor 202 may establish the connection by opening a secure socket connection using, for instance, Transport Layer Security and may communicate with the message queue 120 via the Active Message Queue Protocol through the domain boundary 130. The message queue 120 may store the response 114 and may wait for the web interface 110 to pull the response 114 from the message queue 120 as discussed herein.

In some examples, instead of automatically pulling the request 112 from the message queue 120 based on a determination that the request 112 is stored in the message queue 120, the processor 202 may determine whether the processor 202 is to pull the request 112 from the message queue 120. That is, the processor 202 may determine, for instance, based on a configurable scheduling scheme, whether the processor 202 is to pull the request 112. Based on a determination that the processor 202 is not to pull the request 112, the processor 202 may not pull the request 112. In this case, the processor of another apparatus 104 (or a service other than the service that the processor 202 may be executing) may pull the request 112. Again, the determination as to which processor 202 (or service) is to pull the request 112 from the message queue 120 may be based on the configured scheduled scheme. The processor 202 may thus pull the request 112 based on a determination that the processor 202 and not another processor (or service) is to pull the request 112.

Figure 3:
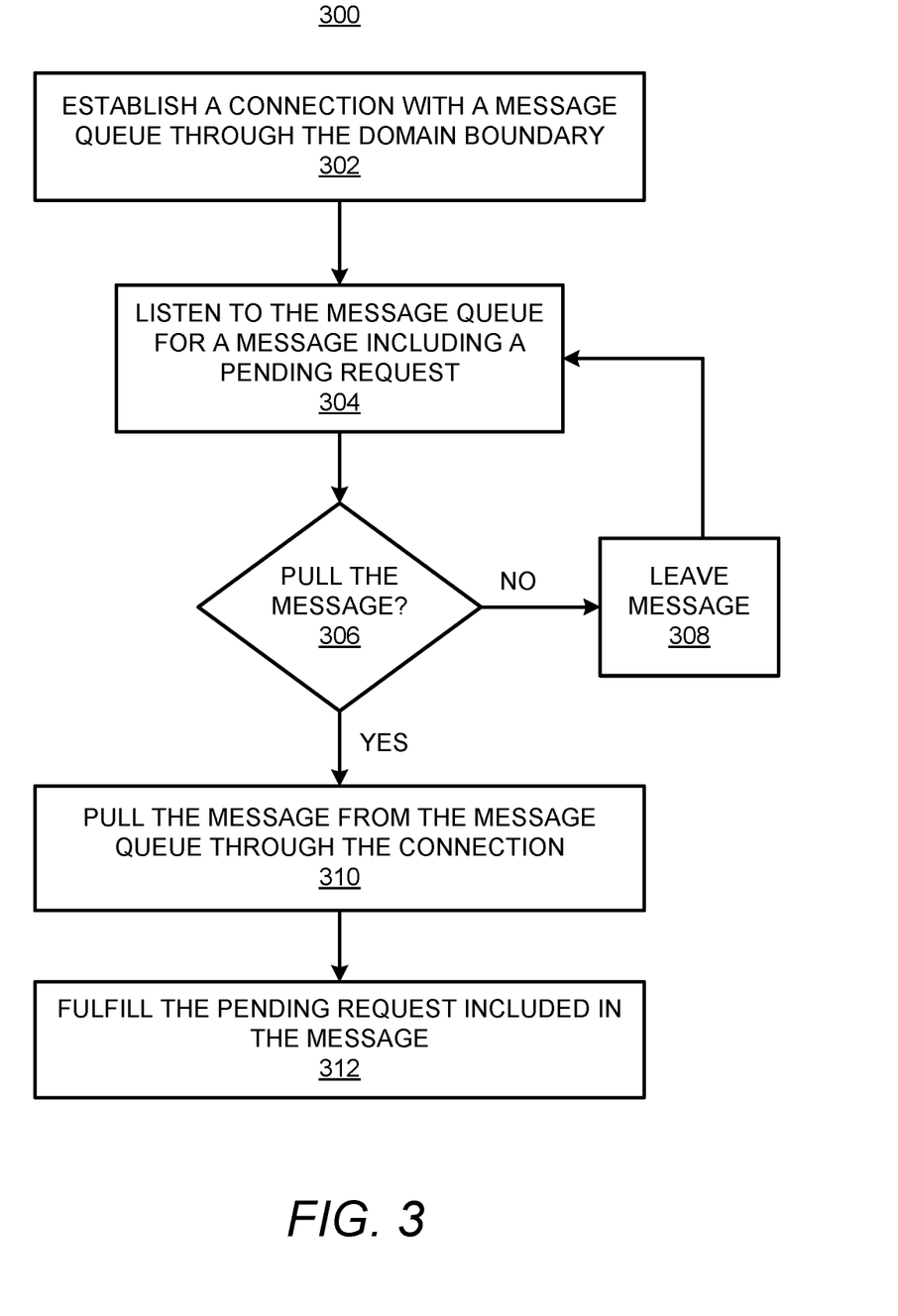
FIGS. 3 and 4, respectively, depict flow diagrams of methods for securely fulfilling a pending request for a response, in which the request is submitted outside of a domain boundary and the request is fulfilled within the domain boundary, in accordance with an embodiment of the present disclosure.
Figure 4:
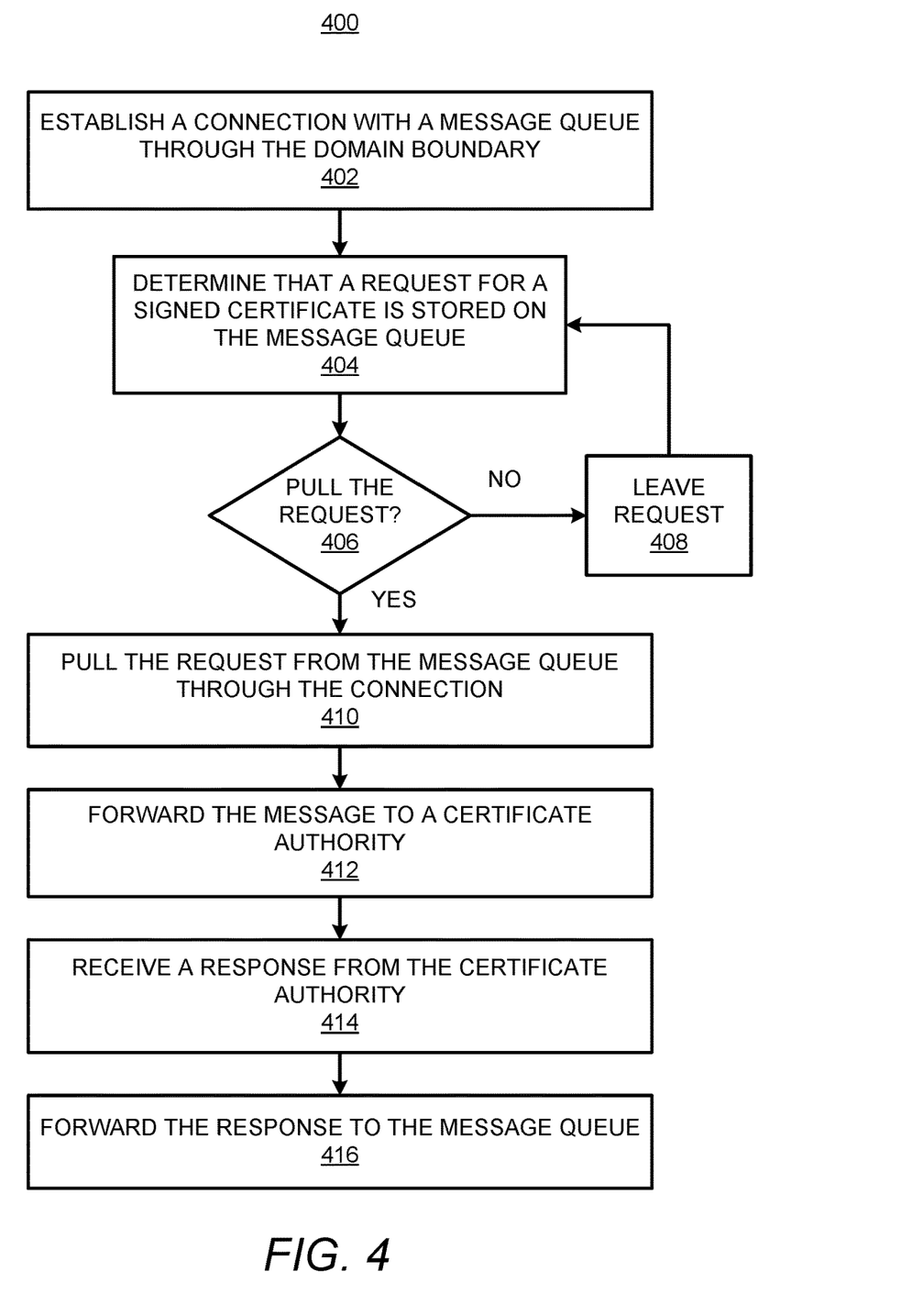

Various manners in which the processor 202 of the apparatus 102 may operate are discussed in greater detail with respect to the methods 300 and 400 depicted in FIGS. 3 and 4. Particularly, FIGS. 3 and 4, respectively, depict flow diagrams of methods 300 and 400 for securely fulfilling a pending request 112 for a response 114, in which the request 112 is submitted outside of a domain boundary 130 and the request 112 is fulfilled within the domain boundary 130, in accordance with embodiments of the present disclosure. It should be understood that the methods 300 and 400 respectively depicted in FIGS. 3 and 4 may include additional operations and that some of the operations described therein may be removed and/or modified without departing from the scopes of the methods 300 and/or 400. The descriptions of the methods 300 and 400 are made with reference to the features depicted in FIGS. 1 and 2 for purposes of illustration.

At block 302, the processor 202 may establish a connection with the message queue 120 through the domain boundary 130. That is, the processor 202 may initiate a connection with the message queue 120 that is outbound from the domain boundary 130. In other words, the message queue 120 may not establish a connection inbound to the domain boundary 130 to the apparatus 102. As a result, attacks on the devices within the domain boundary 130 may be reduced or prevented as discussed herein. As discussed herein, the apparatus 102, and thus the processor 202, is within a domain boundary 130 and the message queue 120 is outside of the domain boundary 130.

At block 304, the processor 202 may, through the connection established through the domain boundary 130, listen to the message queue 120 to determine whether a message including a pending request 112 is stored on the message queue 120. In some examples, the processor 202 may employ a message listener program to listen to the message queue 120. The message listener program may, for instance, poll the message queue 120 at certain times to determine whether the message is stored on the message queue 120.

At block 306, the processor 202 may, based on a determination that the message including the pending request 112 is stored on the message queue 120, determine whether the processor 202 is to pull the message from the message queue 120. As discussed herein, the processor 202 may determine whether the processor 202 is to pull the message based on application of a configurable scheduling scheme.

At block 308, the processor 202 may, based on a determination that the processor 202 is not to pull the message from the message queue 120, leave the message in the message queue 120. In addition, the processor 202 may continue to listen to the message queue 120 for messages.

At block 310, the processor 202 may pull the message from the message queue 120 through the established connection. In addition, at block 312, the processor 202 may fulfill the pending request 112 included in the message. As discussed herein, the processor 202 may fulfill the pending request 112 by forwarding the message to a server 140, which may process the pending request 112 and generate a response 114 to the pending request 112. The server 140 may also forward the response 114 to the apparatus 102 and the processor 202 may forward the response 114 to the message queue 120.

Turning now to FIG. 4, at block 402, the processor 202 may establish a connection with the message queue 120 through the domain boundary 130. That is, the processor 202 may initiate a connection with the message queue 120 that is outbound from the domain boundary 130.

At block 404, the processor 202 may determine that a request 112 for a signed certificate is stored on a message queue 120. The signed certificate may be a security item that the requester, e.g., a client device, may use to gain access to a secure service provided by a website. In addition, the processor 202 may determine whether the request 112 is stored on the message queue 120 in any of the manners discussed herein.

At block 406, the processor 202 may, based on a determination that the request 112 is stored on the message queue 120, determine whether the processor 202 is to pull the request 112 from the message queue 120. As discussed herein, the processor 202 may determine whether the processor 202 is to pull the request 112 based on application of a configurable scheduling scheme.

At block 408, the processor 202 may, based on a determination that the processor 202 is not to pull the request 112 from the message queue 120, leave the request 112 in the message queue 120. In addition, the processor 202 may continue to determine whether a request 112 for a signed certificate is stored on the message queue 120.

At block 410, the processor 202 may pull the message from the message queue 120 through the established connection. In addition, at block 412, the processor 202 may forward the request 112 to a certificate authority (e.g., a server 140). The certificate authority may process the request 112 and, if the requester is authenticated, may generate a signed certificate (response 114) for the requester of the request 112. In addition, the certificate authority may forward the signed certificate to the apparatus 102. In other words, at block 414, the processor 202 may receive the response 114 (signed certificate) from the certificate authority. In addition, at block 416, the processor 202 may forward the response 114 (signed certificate) to the message queue 120 through the domain boundary 130. The message queue 120 may store the response 114 until, for instance, a web interface 110 pulls the response 114 (signed certificate) for the requester.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
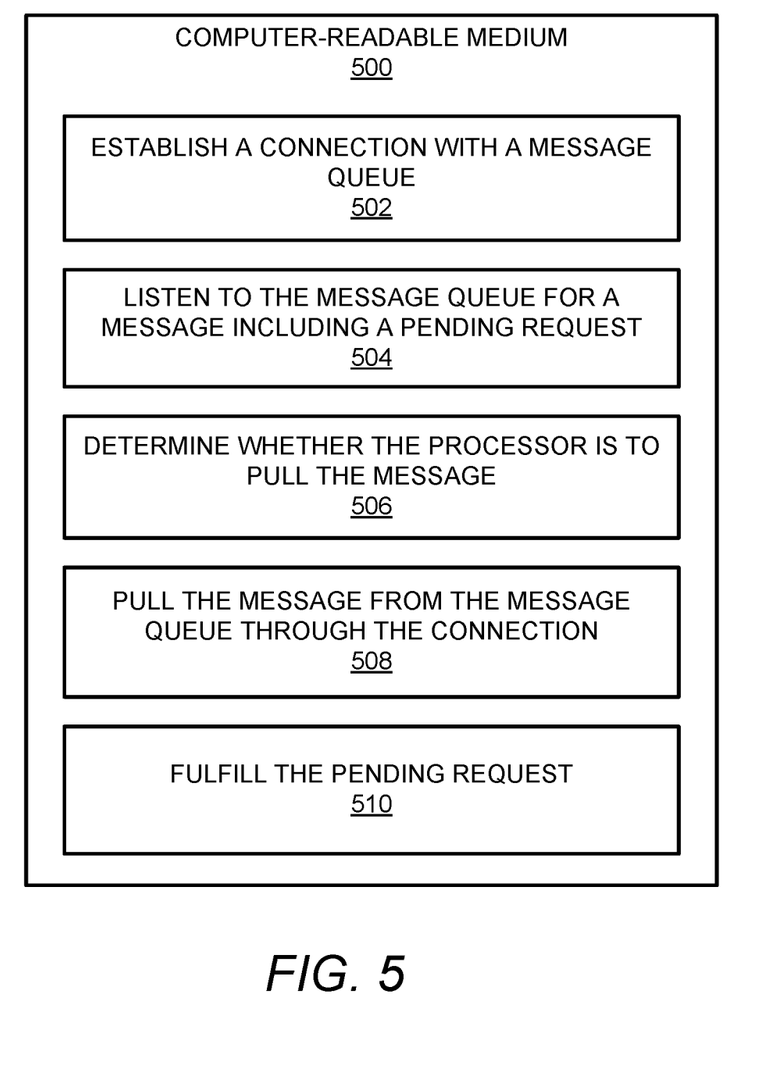
FIG. 5 depicts a block diagram of a computer-readable medium that may have stored thereon computer-readable instructions for fulfilling a request within a domain boundary, in accordance with an embodiment of the present disclosure.

Turning now to FIG. 5, there is shown a block diagram of a computer-readable medium 500 that may have stored thereon computer-readable instructions for fulfilling a request within a domain boundary 130, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon machine-readable instructions 502-510 that a processor, such as the processor 202 depicted in FIG. 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to establish a connection with the message queue 120 through the domain boundary 130. The processor may fetch, decode, and execute the instructions 504 to listen to a message queue 120 to determine whether a message including a pending request 112 is stored on the message queue 120. The processor may, based on a determination that the message including the pending request 112 is stored on the message queue 120, fetch, decode, and execute the instructions 506 to determine whether the processor 202 is to pull the message from the message queue 120. The processor may fetch, decode, and execute the instructions 508 to pull the message from the message queue 120 through the established connection. In addition, the processor may fetch, decode, and execute the instructions 510 to fulfill the pending request 112 included in the message.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that cause the processor to:
   initiate a connection from the apparatus to a message queue to determine whether the message queue contains a request, the apparatus being inside of a domain and the message queue being outside of the domain;

based on a determination that the message queue contains a request, pull the request from the message queue to the apparatus through a domain boundary;
after pulling the request from the message queue, determine that the pulled request is a request for a signed certificate to be used to access a particular service;
in response to the determination that the pulled request is a request for a signed certificate to be used to access the particular service, forward the pulled request to a certificate authority server, wherein the certificate authority server is to determine whether a requester of the pulled request is authorized to receive the signed certificate;
receive a response, including the signed certificate, from the certificate authority server in response to a determination by the certificate authority server that the requester is authorized to receive the signed certificate; and
forward the response, including the signed certificate, from the apparatus to the message queue through the domain boundary.

2. The apparatus of claim 1, wherein the signed certificate is for the requester of the pulled request to use to access the particular service provided by a particular website.

3. The apparatus of claim 1, wherein the instructions further cause the processor to:
based on the determination that the message queue contains the request, determine whether the processor is to pull the request from the message queue;
based on a determination that the processor is to pull the request, pull the request from the message queue; or
based on a determination that the processor is not to pull the request, leave the request in the message queue.

4. The apparatus of claim 3, wherein the instructions further cause the processor to:
determine whether the processor is to pull the request from the message queue based on whether it is the processor's turn in a round-robin scheme to pull the request.

5. The apparatus of claim 3, wherein the instructions further cause the processor to:
determine whether the processor is to pull the request from the message queue based on a configurable scheduling scheme to pull the request.

6. The apparatus of claim 3, wherein the apparatus is part of a collection of apparatuses that are to fulfill requests stored in the message queue and to take turns with other apparatuses in the collection of apparatuses in pulling the requests stored in the message queue.

7. The apparatus of claim 1, wherein the instructions further cause the processor to:
employ a message listener to check for requests in the message queue at predetermined times.

8. A system comprising:
an apparatus within a domain boundary, the apparatus including a processor to:
initiate a connection from the apparatus to a message queue outside of the domain boundary to determine whether the message queue contains a request;
based on a determination that the message queue contains a request, pull the request from the message queue to the apparatus through the domain boundary;
after pulling the request from the message queue, determine that the pulled request is a request for a signed certificate to be used to access a particular service;
in response to the determination that the pulled request is a request for a signed certificate to be used to access the particular service, forward the pulled request to a certificate authority server, wherein the certificate authority server is to determine whether a requester of the pulled request is authorized to receive the signed certificate;
receive a response, including the signed certificate, from the certificate authority server in response to a determination by the certificate authority server that the requester is authorized to receive the signed certificate; and
forward the response, including the signed certificate, from the apparatus to the message queue through the domain boundary.

9. The system of claim 8, further comprising:
a second apparatus operating within the domain boundary, the second apparatus including a second processor to:
determine whether the request is stored on the message queue;
based on a determination that the request is stored on the message queue, determine whether the second processor is to pull the request from the message queue;
based on a determination that the second processor is to pull the request from the message queue, pull the request from the message queue;
fulfill the request to cause the response to the request to be generated; and
forward the response to the message queue through the domain boundary.

10. The system of claim 9, wherein the processor and the second processor are each to determine whether to pull the request from the message queue based on application of a configurable scheduling scheme.

11. The system of claim 10, wherein, based on a determination that the processor is not to pull the request from the message queue, leave the request in the message queue.

12. The system of claim 8, wherein the signed certificate is for the requester of the pulled request to use to access the particular service provided by a particular website.

13. The system of claim 8, further comprising:
a second message queue outside of the domain boundary, wherein the processor is to listen for storage of requests in both the message queue and the second message queue.

14. The system of claim 8, wherein the message queue is unauthorized to establish a connection with the apparatus through the domain boundary.

15. A method comprising:
establishing, by a processor of an apparatus, a connection from the apparatus to a message queue through a domain boundary, wherein the apparatus is within the domain boundary and the message queue is outside of the domain boundary;
determining, by the processor and through the connection, whether the message queue contains a request;
based on a determination that the message queue contains a request, pulling, by the processor, the request from the message queue to the apparatus through the domain boundary;
after pulling the request from the message queue, determining that the pulled request is a request for a signed certificate to be used to access a particular service;
in response to the determination that the pulled request is a request for a signed certificate to be used to access the particular service, forwarding, by the processor, the pulled request to a certificate authority server, wherein the certificate authority server is to determine whether a requester of the pulled request is authorized to receive the signed certificate;

receiving, by the processor, a response, including the signed certificate, from the certificate authority server in response to a determination by the certificate authority server that the requester is authorized to receive the signed certificate; and forwarding, by the processor, the response, including the signed certificate, from the apparatus to the message queue through the domain boundary.

16. The method of claim 15, wherein the message queue is unauthorized to establish a connection with the processor through the domain boundary.

17. The method of claim 16, wherein the response is the signed certificate for the requester of the pulled request to use to access the particular service provided by a particular website.

18. The method of claim 15, further comprising:
determining whether to pull the request from the message queue based on application of a configurable scheduling scheme.

* * * * *